United States Patent [19]

Black

[11] 4,181,911
[45] Jan. 1, 1980

[54] TARGET RELEASE SYSTEM

[76] Inventor: Billy E. Black, 232 Monte Vista Dr., Bakersfield, Calif. 93305

[21] Appl. No.: 770,184

[22] Filed: Feb. 18, 1977

[51] Int. Cl.² .............................................. H04B 7/00
[52] U.S. Cl. .................................... 343/225; 119/15.6; 124/34; 124/32; 124/31; 273/105.2; 273/105.6; 307/141
[58] Field of Search ........................ 124/1, 34, 32, 6, 7, 124/8, 31; 35/25; 273/101.2, 101.1, 105.2, 105.6, 102 A, 102 P, 102.1 R, 102.1 B; 340/148, 224; 46/256, 254; 343/225; 119/15.6; 307/141

[56] References Cited

U.S. PATENT DOCUMENTS

| | | | |
|---|---|---|---|
| 2,427,010 | 9/1947 | Lohr | 273/105.6 |
| 2,855,916 | 10/1958 | Foster | 124/32 |
| 3,357,405 | 12/1967 | Stormon et al. | 119/15.6 |
| 3,438,037 | 4/1969 | Leland | 343/225 |
| 3,466,609 | 9/1969 | Ohlund | 343/225 |
| 3,568,199 | 3/1971 | Hartness | 124/32 |
| 3,586,331 | 6/1971 | Tickell | 273/105.2 |
| 3,671,817 | 6/1972 | Seipp | 307/141 |
| 3,770,981 | 11/1973 | Nelsen | 124/32 |

Primary Examiner—John W. Caldwell, Sr.
Assistant Examiner—Donnie L. Crosland
Attorney, Agent, or Firm—Huebner & Worrel

[57] ABSTRACT

A target release system, particularly suited for use in simulating the hunting of wild game, characterized by a portable signal transmitter for transmitting detectable signals in a terrestrial space environment, a plurality of visually secluded signal receivers for singly detecting signals transmitted by said transmitter, and a target release subsystem connected with each of the signal receivers for releasing at least one target in response to transmitted signals detected by the receiver.

14 Claims, 5 Drawing Figures

TRANSMITTER

TO OTHER
TARGET BOXES

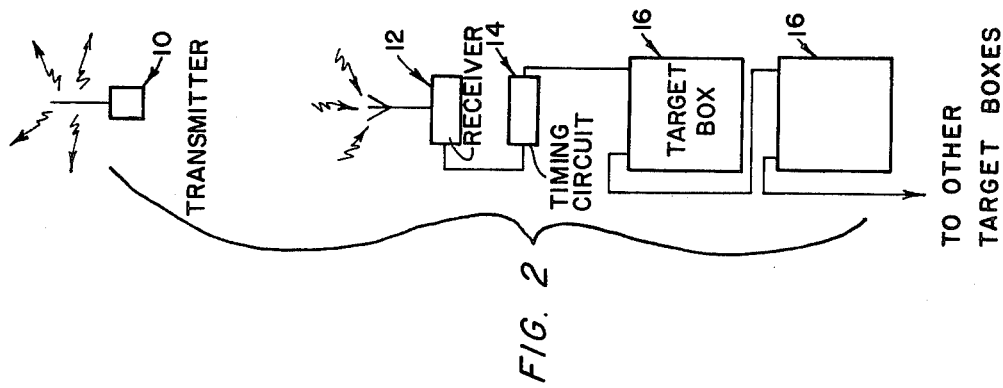
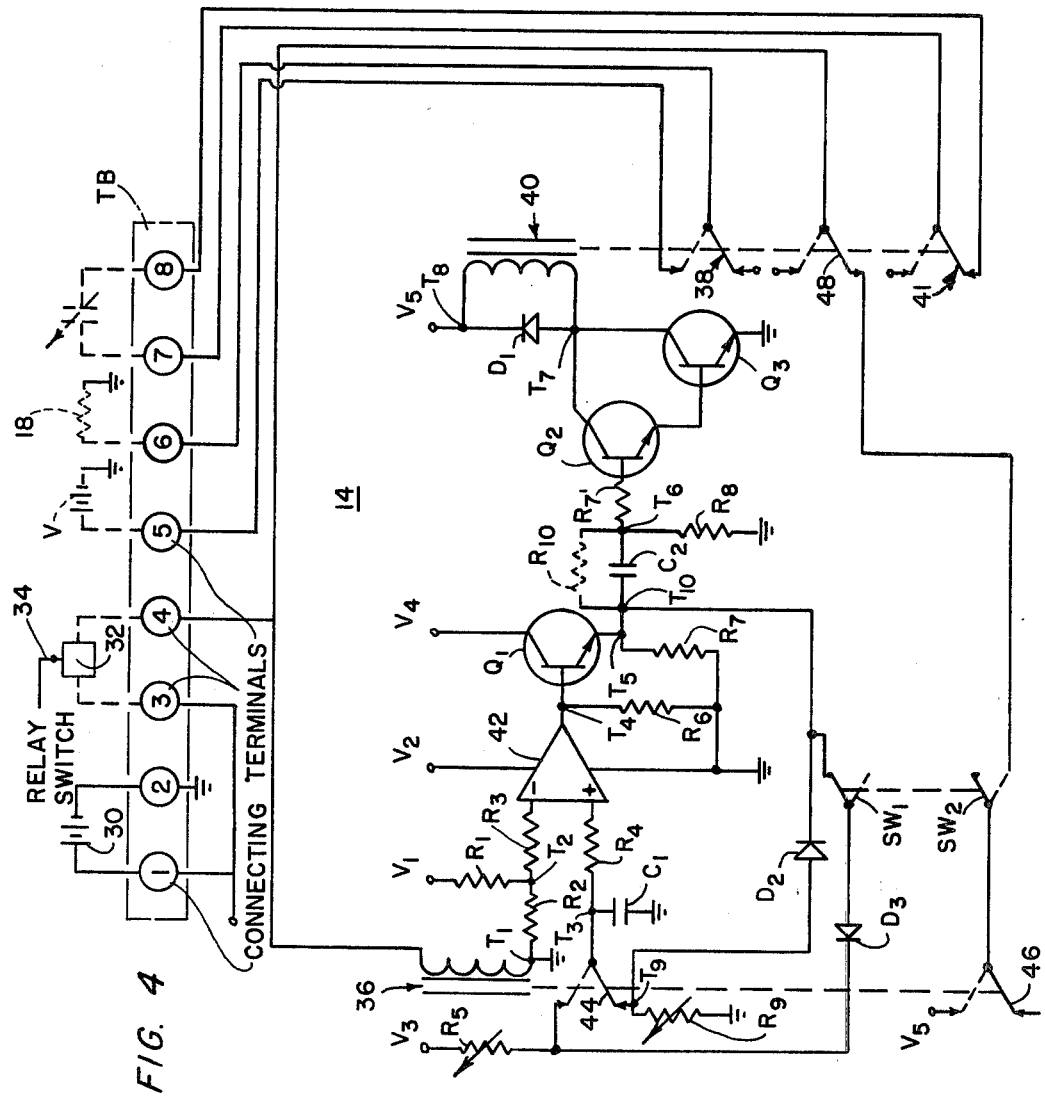

TARGET RELEASE SYSTEM

BACKGROUND OF THE INVENTION

1. Field of the Invention

The invention generally relates to target release systems, and more particularly to a target release system adapted to respond to signals transmitted by a portable transmitter for releasing surprise targets from visually secluded sources.

As can be appreciated by devotees of firearms, such as hunters of small game and the like, urban sprawl has adversely affected the recreational use of firearms, such as small caliber rifles, shotguns, handguns and the like. Such, of course, is a consequence of increased numbers of persons having increased quantities of leisure time utilizing increased space. Thus the continued existence of natural habitats for birds and animals of the type which previously served as an abundant source of game for larger numbers of sportsmen has been jeopardized and the recreational use of sporting goods such as bows and arrows, small caliber firearms and the like has been reduced. Consequently, a reduction in interest in the recreational use of firearms, attended by a loss in revenue, has been experienced generally throughout the industry.

2. Description of the Prior Art

Attempts, of course, have been made to overcome the loss of interest in the recreational use of firearms through increased use of targets such as clay pigeons, pop-up targets and the like. However, as also can be appreciated by sportsmen, particularly hunters of small game, the use of currently available facilities for target practice simply does not provide a challenge equaling that presented by surprise targets such as birds, small game and the like normally pursued by sportsmen in their natural habitat. It is, therefore apparent that there currently exists a need for a system through which flight of wild game is simulated for use by sportsmen and the like, particularly confined to densely populated areas.

Of course, it should be apparent that any system employed must be capable of precluding an accidental tripping by stray signals of any other randomly encountered actuators. Moreover, the system must include, for safety purposes, mechanisms and devices which prevent accidental release of targets while a user is within potential line of fire.

It is therefore the purpose of the instant invention to provide a target release system particularly suited for safely releasing surprise targets which simulate the flight of wild game of the type characterized by birds, rabbits, deer and the like in a controlled environment such as on a "course" through which sportsmen walk in a manner substantially the same as that in which hunters pursue small game.

OBJECTS AND SUMMARY OF THE INVENTION

It is therefore an object of the instant invention to provide a target release system for use in releasing surprise targets.

Another object is to provide a target release system for use in releasing surprise targets from hidden or visually secluded sources.

It is another object to provide a target release system particularly suited for releasing targets from visually secluded sources in response to radio signals transmitted from a portable transmitter.

It is another object to provide for use in a target release system a portable transmitter adapted to be transported upon the person of a user, mutually spaced secluded receivers for receiving signals transmitted by the transmitter, and multiple target release mechanisms connected with the receivers for releasing targets from visually secluded target boxes in response to signals transmitted by the portable transmitter and detected by the receivers.

It is another object to provide in a target release system for use in simulating the hunting of wild game and the like, a timing circuit for controlling the operation of target boxes in response to radio signals detected by receivers and transmitted by a portable transmitter affixed to the person of a user of the system.

Another object is to provide a target release system for use in simulating the hunting of wild game which includes circuitry adapted to ensure that hunters or other users are out of line of fire before targets are released.

Another object is to provide a target release system particularly suited for use in simulating the hunting of wild game and the like using bows and arrows, small caliber rifles, shotguns, handguns and the like, although not necessarily restricted in use thereto, since the system of the instant invention is similarly useful when employed in other vocations and avocations, such as in training personnel in the use of firearms and the like.

These together with other objects and advantages are achieved through the use of a system which includes a portable transmitter adapted to be worn by a user, visually secluded receivers and time delay circuits for actuating visually secluded target release mechanisms as will become more readily apparent by reference to the following description and claims in light of the accompanying drawings.

BRIEF DESCRIPTION OF THE DRAWINGS

FIG. 2 is a block diagrammatic view illustrating component relation for the target release system of the instant invention.

FIG. 4 is a schematic view of a timing circuit employed in controlling the operation of the target box shown in FIG. 3.

DESCRIPTION OF THE PREFERRED EMBODIMENT

General Description

Figure 1:
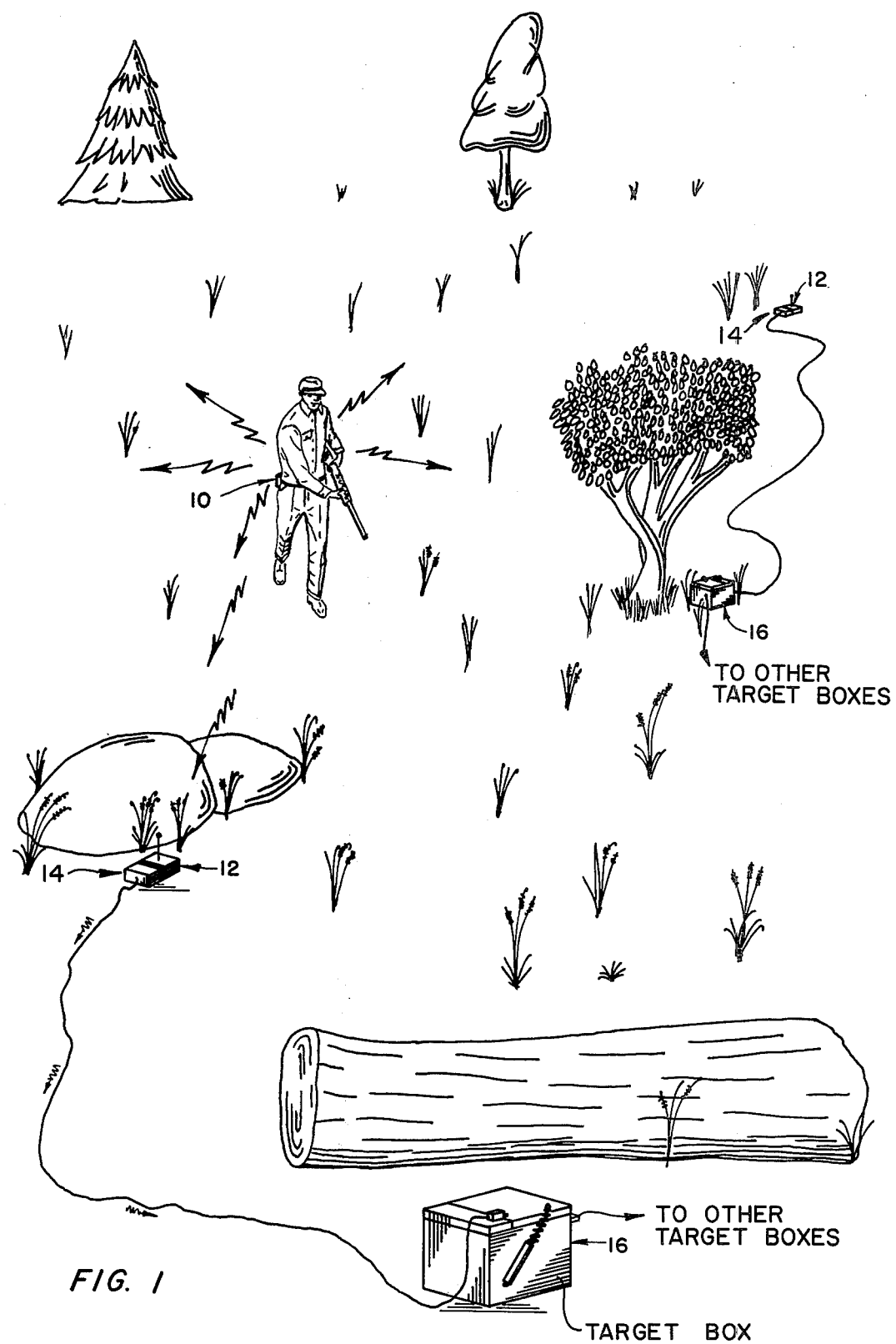
FIG. 1 is a pictorial view illustrating a use of a target release system which embodies the principles of the instant invention.
Figure 3:
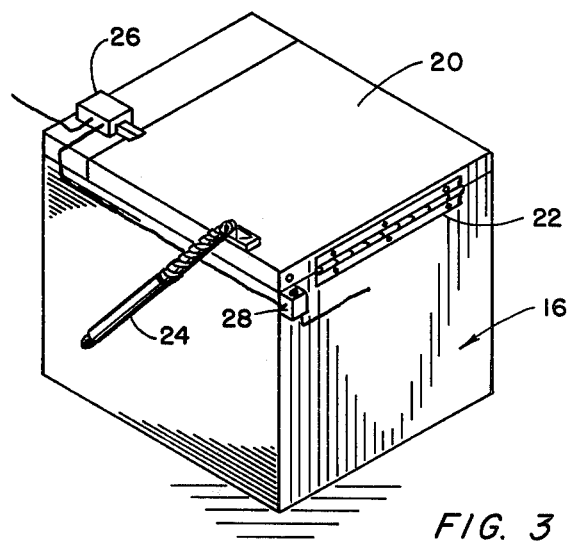
FIG. 3 is a perspective view of a target box for the system.

Referring now to the drawings, with more particularity, wherein like reference characters designate like or corresponding parts throughout the several views, there is shown in FIG. 1 a target release system which embodies the principles of the instant invention.

As shown, the system includes components secluded in an environment of rocks, trees, logs and the like indigenous to the environments comprising natural habitats for identified small game. However, it is to be understood that where desired the components are situated for releasing targets in environments found in urban areas or, for that matter, any other environment within which surprise targets are commonly encountered by a pursuer.

As illustrated in FIG. 1, the system which embodies the principles of the invention includes a portable transmitter 10, worn by a hunter, and a plurality of receivers, each being generally designated 12. A timing circuit 14 is connected between each of the receivers 12 and a plurality of series connected target boxes 16, as illustrated in FIGS. 1 and 2. It is to be understood that each receiver 12 and its associated timer circuit 14, and a plurality of target boxes 16 collectively establish one of a plurality of similar subcircuits designated 18.

A hunter, as shown in FIG. 1, wearing the transmitter 10 walks along a course through visually secluded receivers 12, while the transmitter continuously transmits a radio signal at selected frequencies and over a limited range. The receivers 12, being of fixed sensitivity, detect the signals being transmitted as the hunter comes into close proximity therewith and thereupon provide output signals via an armed timing circuit 14 to visually secluded target boxes 16. These boxes, in turn, release targets from secluded locations in sequence, affording the hunter opportunities to shoot. The timing circuit 14 imposes a delay of a predetermined period before release of the targets occurs. This period is of a duration sufficient to prevent accidental tripping by stray signals. Additionally, the timing circuit serves to prevent the target boxes 16 from being twice activated while the hunter remains in the immediate vicinity of the receiver, as well as for a predetermined period thereafter. However, once the hunter moves out of the range of the receiver 12, and the predetermined period expires, the timing circuit 14 automatically re-arms.

Transmitter - Receiver

The transmitter 10 preferably is of a commercially available design. Therefore, a detailed description of the transmitter 10 is omitted in the interest of brevity. However, for the sake of completeness, it is to be understood that the transmitter 10, as currently employed, includes a radio frequency oscillator circuit adapted to produce a carrier wave signal which is, in turn, modulated by the output of an audio frequency oscillator circuit. Such transmitters are commonly used for remotely controlling the operation of garage doors. However, the transmitter 10, as currently employed, also includes a maintained contact slide switch connected in parallelism with a momentary contact push-button switch for accommodating continuous transmission, where so desired.

The transmitter 10 is packaged in a suitable housing, not designated, adapted to be attached through the use of straps, clips and the like to the person of a hunter or other user of the system, as best illustrated in FIG. 1.

The receiver circuit for the receiver 12 also is of a commercially available design. Again, for the sake of brevity, a detailed description of the receiver 12 is omitted. However, it should be appreciated that the receiver 12, as currently employed, comprises a radio signal receiver circuit having a first stage RF amplifier circuit and a second stage RF amplifier circuit connected in series with the first stage amplifier. The second stage RF amplifier is, in practice, a regenerative amplifier circuit which provides a feedback to the input of the first stage RF amplifier for increasing overall gain of the circuit. The total gain of the RF amplifier circuit preferably is adjustable for reasons which should hereinafter become apparent.

The output from the second stage RF amplifier is delivered to an audio frequency amplifier in which undesired audio frequency tones are removed by band pass network of conventional design. The output of the audio frequency amplifier circuit is used to switch the receiver 12 to its ON mode whereupon a timer circuit driver signal is applied to the timing circuit 14 and utilized for purposes of initiating a timing cycle for the timing circuit 14. The timing circuit 14 ultimately provides an output signal to the plurality of target boxes 16 which respond thereto for releasing targets, all in a manner as will hereinafter become more readily apparent.

Moreover, it is to be understood that by varying the sensitivity of each of the receivers 12, a cycle of operation for the system can be inititaed by signals transmitted over different distances which, in practice, simulate the differences at which targets normally would be encountered in a natural habitat. Moreover, by varying the sensitivity of the recievers, it is possible to further enhance safety of users of the system.

Also, for purposes of ensuring the safety of users of the system, the timing circuit 14 will respond to a driver signal and thereafter revert to a quiescent state until the circuit is re-armed, and the circuit will not re-arm until the transmitter 10 is transported away from the receiver a distance sufficient to remove the timing circuit driver signal from the output of the receiver.

It is important to note that the specific design for the target boxes 16 may be varied as desired in order to release targets of a selected nature. As currently employed, each of the target boxes 16 serves to release a surprise target which, preferably, comprises an inanimate object. Such targets are selected on the basis of the characteristics for which, of course, the target boxes 16 are designed to release. For example, where desired, each target box 16 is designed for releasing gas-filled balloons and includes a suitable housing having a pivotal lid 20 supported for pivotal displacement about a horizontal axis of a hinge 22, under the influence of a compression spring assembly 24. The lid 20, in turn, is supported in a closed configuration by a latching dog of a solenoid actuated latch 26.

Figure 5:
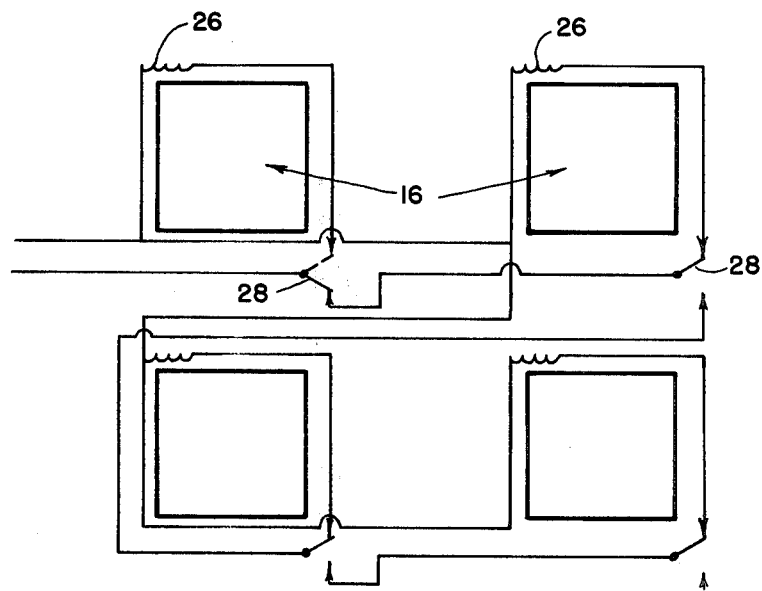
FIG. 5 is a diagrammatic view illustrating a plurality of target boxes connected in circuit series.

Additionally, it is to be understood that the target boxes 16 are connected in circuit series for accommodating a sequential release of a series of targets. Therefore, a suitable button switch 28 is mounted on each of the target boxes 16 in close proximity with the lid 20 so that as the lid 20 is rotated toward its fully open configuration, the button switch is depressed. As the button switch is depressed, an electrical circuit is completed to an adjacent target box, as best illustrated in FIG. 5. Thus each of the switches 28 is caused to function as an arming switch for an adjacent solenoid actuated latch 26. As a practical matter, the compression spring assembly, where desired, includes a damping device which inhibits motion of the lid 20, so that, in operation, the switch 28 will not close for a period sufficient for the hunter to depart the area. Thus only one target will be released during one cycle operation.

Finally, it is to be understood that where so desired, the target boxes may be so designed as to function as self-charging motors which launch a target upon receipt of a signal, and selfload in response to removal of the signal.

The Timing Circuit

As shown in the drawings, FIG. 4, the timing circuit 14 includes a plurality of connecting terminals designated 1 through 8, mounted on a common terminal board TB. Across terminals 1 and 2, there is connected a 12-volt battery 30. This battery serves as a source of electrical potential for the circuit 14, as will hereinafter become apparent.

Connected in circuit series with the battery 30, between terminals 3 and 4, there is provided a normally open relay switch 32. The switch 32 is connected with the receiver through a suitable lead 34. The relay switch 32 serves as an input switch for a timing circuit driver signal, as will hereinafter become more readily apparent.

To the terminal 4 there is connected the coil of a relay, generally designated 36. The opposite side of the coil of the relay is connected to ground at terminal $T_1$. Hence, once the relay actuated switch 32 is closed, battery voltage is applied across the coil of the relay 36. It is to be understood that application of the voltage across the coil of the relay 36 serves to initiate a timing cycle for the timing circuit.

Connected to the terminal 5 is a voltage source V for the subcircuit 18, as schematically illustrated in FIG. 4. Voltage is, in operation, applied to the terminal 6 from terminal 5 in response to the closing of a normally open relay actuated switch 38. This switch includes a shorting bar, not designated, connected with a relay 40 so that when the coil of the relay is energized, the shorting bar is positioned across the contacts of the switch 38 for thus effecting a closing thereof. Closing of the switch 38, in turn, serves to complete a circuit between a voltage source V and the subcircuit 18.

The terminals 7 and 8 are connected in any suitable auxiliary circuit, not designated, characterized by a system supporting function. For example, the terminals 7 and 8, where desired, are connected in an audio circuit which serves to initiate operation of suitable sound reproducing mechanisms, upon a closing of a series connected switch 41, which lends authenticity to a hunt or similar exercise being conducted.

In order to energize the relay 40, for thus initiating a cycle of operation for the circuit 18, there is provided a differential IC amplifier 42. This amplifier circuit is of known design and is normally biased to an OFF condition through a biasing network which provides a reference voltage input. The biasing network includes a 100 kilohm resistor $R_1$, a 22 kilohm resistor $R_2$ and one mega ohm resistor $R_3$. The resistor $R_1$ is connected between a positive voltage source $V_1$ while a positive voltage source $V_2$ is connected across the IC amplifier 42 so that a positive voltage is applied through the output thereof.

To the positive input of the amplifier 42 there is connected through a resistor $R_4$ a relay actuated switch 44. The output of the amplifier 42 is connected to the base of an NPN transistor $Q_1$, the collector of which is connected to a source of voltage $V_4$. It should be noted that between the output terminal of the amplifier 42, not designated, and the base of the transistor $Q_1$, also not designated, there is connected at terminal $T_4$ a 39 kilohm biasing resistor, designated $R_6$, having one side thereof connected to ground through a suitable lead. The switch 44 is connected to be actuated by the relay 46 for completing a circuit between the amplifier 42 and a positive source of voltage $V_3$. Between the switch 44 and the voltage source $V_3$, there is connected a variable resistor $R_5$ so that current delivered from the voltage source $V_3$ to the positive terminal of the amplifier 42 can be varied for altering the duration of the period required for the amplifier 42 to go high. It is important also to note that control of the operation of amplifier 42 is achieved through the use of a capacitor $C_1$, connected at terminal $T_3$ between the switch 44 and the 100 mega ohm resistor $R_4$, operating in cooperation with the variable resistor $R_5$. In effect, the capacitor $C_1$ must be charged before positive voltage is applied to the positive input terminal of the amplifier 42.

The emitter of transistor $Q_1$ is connected to terminal $T_5$ which, in turn, is grounded through a 10 kilohm resistor $R_7$ connected between the terminal $T_5$ and ground. Thus ground potential also may be applied to the terminal $T_5$. It is important to note that one side of a 2 to 4.7 microfarad capacitor $C_2$ also is connected to the terminal $T_5$ while the opposite side thereof is connected to a terminal $T_6$. The terminal $T_6$, in turn, is connected through a 6.8 kilohm resistor $R_7'$ to the base of another NPN transistor, designated $Q_2$. As a practical matter, the base of the transistor $Q_2$ normally is reverse biased by ground potential applied through a resistor $R_8$ at the terminal $T_6$.

In view of the foregoing, it should be apparent that capacitor $C_2$ begins to charge in response to a switching of the transistor $Q_1$ to its conductive state. As the capacitor $C_2$ is charged, ground potential is removed from terminal $T_6$ permitting a positive going voltage to be applied to the base of transistor $Q_2$. The collector of transistor $Q_2$, in turn, is connected to a source of positive voltage $V_5$ at terminal $T_7$ through diode $D_1$. The emitter of transistor $Q_2$ is connected to the base of NPN transistor $Q_3$ through a lead, not designated.

The emitter of transistor $Q_3$ is connected to ground while the collector thereof also is connected at terminal $T_7$. As a practical matter, the coil of the relay 40 is connected at one side thereof to terminal $T_7$ and at the other side to the voltage source $V_5$ at terminal $T_8$. Consequently, once transistor $Q_2$ is forward biased, a current flow is established through the coil of the relay 40. Thus the coil becomes energized for actuating the relay.

As a practical matter, the voltage source $V_5$ is connected to terminal $T_7$ through terminal $T_8$ so that a positive voltage is continuously applied to the collectors of transistors $Q_2$ and $Q_3$ through terminal $T_7$. A current blocking diode $D_1$ is connected between the terminals $T_7$ and $T_8$ and thus is connected between the opposite ends of the coil.

In view of the foregoing, it should be apparent that once the charging of capacitor $C_2$ is initiated, transistor $Q_2$ is rendered conductive for thus applying positive voltage to the base of transistor $Q_3$, whereupon transistor $Q_3$ is caused to conduct heavily, between terminal $T_7$ and ground, for thus establishing a current path from the voltage source $V_5$ through the coil winding, not designated, of relay 40. Of course, once the capacitor $C_2$ becomes fully charged, terminal $T_6$ goes to ground potential and the positive voltage charge is removed from the base of transistor $Q_2$ causing the transistor to switch to its nonconductive mode. The positive going voltage thus is removed from the base of transistor $Q_3$ causing this transistor to cease to conduct. As transistor $Q_3$ ceases to conduct, the winding of the coil of the relay 40 de-energizes. De-energization of the coil permits the relay 40 to release the shorting bar of the switch 38, thus permitting this switch to again open for thus interrupting a circuit through the subcircuit 18.

In practice, a variable resistor $R_9$ is connected to the switch 44, at terminal $T_9$, and connected between capacitor $C_2$ and terminal $T_5$ at terminal $T_{10}$. As $Q_1$, of course, ceases to conduct, positive voltage is removed from terminal $T_4$ so that capacitor $C_2$ is permitted to discharge to ground through terminal $T_5$ and resistor $R_7$.

In order to terminate the output of positive voltage from amplifier 42, the switch 44 is permitted to open, in response to an opening of the switch 32. Opening of the switch 32, on the other hand, occurs in response to a termination of a timing circuit driver signal derived from the receiver 12.

It is important to note that the switch 44 is a double throw switch through which capacitor $C_1$ is connected to the voltage source $V_3$, through variable resistance $R_5$, or is connected to ground through variable resistance $R_9$. Hence, once the switch 44 opens between terminal $T_3$ and the resistance $R_5$, in response to a de-energization of the windings of the coil of the relay 36, the capacitor $C_1$ starts to discharge to ground through resistor $R_{10}$. Discharge of capacitor $C_1$ continues and the voltage applied by capacitor $C_1$ to the positive input of amplifier 42 drops to a value less than the reference voltage applied from voltage source $V_1$ through the reference voltage network. At this time, the positive output of the amplifier 42 drops to a level such that transistor $Q_1$ becomes reverse biased.

It is important to note that terminal $T_3$ also is connected to terminal $T_{10}$, through diode $D_2$, and thus is connected to ground through terminal $T_5$ and resistance $R_7$. Consequently, once a circuit is completed between terminals $T_3$ and $T_{10}$, through switch 44, discharge of capacitor $C_1$ to ground through diode $D_2$ and resistor $R_7$ occurs almost instantaneously, regardless of the resistance of $R_9$. With capacitor $C_1$ completely discharged, the timing circuit 14 is re-armed for a subsequent cycle of operation.

As a practical matter, at the time capacitor $C_1$ is charging, terminal $T_3$ also is connected to terminal $T_{10}$ through the switch 44, diode $D_3$ and switch $SW_1$. It will be appreciated, therefore, that as a positive voltage appears at the emitter of $Q_1$, a substantially instantaneous charging of $C_1$ is completed through diode $D_3$ regardless of the resistance of $R_5$.

In some instances, it may be expected that a driver signal from the receiver 12 may be of a duration insufficient to assure that the coil of relay 36 remains energized for a period sufficient to complete an initiation of a cycle of operation of the timing circuit 14. Therefore, where desired, the circuit 14 is provided with an auxiliary circuit which, in effect, serves as a manually operable latching circuit to assure that once a driver signal is received from the output of the circuit of the receiver 12, a circuit between the voltage source $V_3$ and terminal $T_3$ will remain closed until a cycle of operation for the timing circuit has been completed.

This auxiliary circuit includes a source of voltage $V_5$ which is selectively connectable to the windings of a relay 36 through a normally open relay switch 46 manually operable switch $SW_2$, as well as normally closed relay switch 48. The switch 46 is ganged to close with switch 44, the switch 48 is ganged to close with switch 38, while manually operable switch $SW_2$ is ganged to open and close simultaneously with switch $SW_1$.

When the circuit 14 is used in a manually operable mode, the switch $SW_2$ is closed through a simple manipulation, whereupon $SW_1$ opens. Of course, once a driver signal is received from the output of receiver circuit 12, the coil of relay 36 is energized in response thereto for causing switch 44 to close. A circuit now is complete between the voltage $V_5$ and the windings of the relay 36. Hence, the windings of the relay 36 remain energized should the driver signal be removed until such time as switch 38 is actuated for energizing the subcircuit 18 within which the target boxes 16 are connected. Upon energization of the windings of the coil of the relay 40, the switch 48 opens. Thus the circuit between the voltage source $V_5$ and the switch 44 is interrupted. Once the switch 48 is opened, the coil of relay 36 is de-energized for permitting both switches 44 and 46 to open.

As a practical matter, a resistor $R_{10}$ preferably is inserted across capacitor $C_2$ when the circuit is to be employed in a manual mode. Also, it should be apparent that regardless of whether the timing circuit 14 is operated in a normal or manual mode, the circuit cannot be energized until a re-arming thereof has occurred through a discharge of capacitor $C_2$. Hence, a driver signal received at the relay switch 32 will not initiate a cycle of operation of the timing circuit until it has been re-armed through a discharge of capacitor $C_1$. However, upon being re-armed, the timing circuits will, upon receiving a driver signal at the relay switch 3, effect an initiation of a cycle of operation.

FInally, it should be understood that the duration of the periods required for charging and discharging capacitor $C_1$ can be varied simply by varying the resistance of resistors $R_5$ and $R_9$, respectively, for thus varying the period of the timing cycle for the circuit. Moreover, in instances where the circuit is to be operated in a manual mode, switch $SW_1$ is opened for thus preventing an instantaneous charging of capacitor $C_1$, as occurs when switch $SW_1$ is closed.

OPERATION

It is believed that in view of the foregoing description, the operation of the device will readily be understood and it will be briefly reviewed at this point.

With the system embodying the principles of the instant invention, assembled in the manner hereinbefore described, the system may be arranged in a course-like environment through which hunters, sportsmen and the like walk, simulating a pursuit of small game.

Of course, the transmitter 10 is attached to the hunter so that a continuous signal is radiated. Upon approaching the range of a receiver 12, preferably secluded, a signal transmitted by the transmitter 10 is received by the receiver. An output signal which functions as a driver signal for the timing circuit 14 is then applied to the relay switch 32 for closing the switch 32, whereupon a voltage is applied across the coil of the relay 36 for thus actuating relay switch 44. At this instant, capacitor $C_1$ begins to charge through variable resistor $R_5$.

When the voltage across $C_1$ exceeds the reference voltage applied to the negative input of the amplifier 42, the output of the amplifier goes high and a positive voltage appears at terminal $T_4$. This voltage is then applied to the base of transistor $Q_1$ causing this transistor to achieve a conductive state.

Once the transistor $Q_1$ is caused to conduct, the emitter thereof switches from ground potential to positive potential which, in turn, is applied to terminal $T_{10}$. With switch $SW_1$ closed, capacitor $C_1$ is immediately fully charged. The positive voltage is then applied across capacitor $C_2$ whereupon capacitor $C_2$ begins to charge for causing a positive voltage to be applied to the base of transistor $Q_1$, through resistor $R_7$. The emitter of $Q_2$ then delivers a positive voltage output to the base of the transistor $Q_3$, whereupon a circuit is completed from voltage $V_5$ through the coil of relay 40, to ground as transistor $Q_3$ is caused to conduct heavily.

Energization of the coil of relay 40 initiates a closing of the switch 38 for thus completing a circuit through subcircuit 18 of the target boxes 16. Of course, once capacitor $C_2$ has become charged, the positive potential is removed from the base of transistors $Q_2$ and hence $Q_3$, for thus, in effect, interrupting the circuit through the coil of relay 40. Switch 38 then again opens.

It is important to fully appreciate that once capacitor $C_2$ has charged, the coil of relay 40 is de-energized, regardless of a continued application of a driver signal at relay switch 32. However, when the driver signal is removed from the relay switch 32, the coil of relay 36 is de-energized permitting capacitor $C_1$ to discharge to ground through the variable resistor $R_9$ for removing the positive signal at the positive input of the amplifier 42. This permits the amplifier to go low so that transistor $Q_1$ is caused to cease to conduct. Once transistor $Q_1$ ceases to conduct, both capacitors $C_1$ and $C_2$ discharge to ground through resistor $R_7$, regardless of the resistance of resistance $R_9$. Thus the timing circuit 14 is re-armed.

In instances where the timing circuit 14 is operated in a manual mode, the switch $SW_2$ is closed so that an energization of the coil of the relay 36 serves to close relay switch 46. Thus a voltage is applied across the coil of the relay 36 until an actuation of relay switch 48 is achieved in response to an energization of the coil of the relay 40.

In many instances, it may be found desirable to provide an auxiliary circuit adapted to cooperate with subcircuit 18. Such circuit includes sound generating circuits and the like. To this end, the circuit is connected between terminals 7 and 8 and the switch 41 is connected in ganged relation with relay switch 38 so that upon an energization of the coil of the relay 40, the switch 41 is actuated for purposes of achieving a desired function.

Once a circuit is completed between terminals 5 and 6, through relay switch 38, an electrical signal is applied to the first in line latch 26 of the target boxes 16 permitting the lid 20 thereof to pviot to an open position under the influence of spring 24. An opening of the lid 20 serves to release a target from a secluded location providing the hunter with a moving target. As the lid 20 pivots, the button switch 28 is actuated for purposes of connecting the next in line latch 26 for the next in line target box 16. The number of targets released for each cycle of the timing circuit may be varied by varying the time required to actuate the button switches.

In view of the foregoing, it should be readily apparent that the system which embodies the principles of the instant invention provides a practical solution to the perplexing problem of providing sportsmen with a source of realistic targets, even in densely populated areas.

Although the invention has been herein shown and described in what is conceived to be the most practical and preferred embodiment, it is recognized that departures may be made therefrom within the scope of the invention, which is not to be limited to the illustrative details disclosed.

Having described my invention, What I claim as new and desire to secure by Letters Patent is:

1. A target release system for use in simulating the hunting of wild game in a simulated environment for the game comprising:
   A. a plurality of target boxes secluded in a selected environment and arranged in mutually spaced relation, each box being characterized by an electrically energizable target release mechanism adapted to respond to an actuating signal for releasing a game-simulating target;
   B. multiple circuit means interconnecting said plurality of target boxes in mutually spaced relation for establishing a plurality of surcircuits, each subcircuit including a multiplicity of sequentially operable target boxes;
   C. a plurality of timing circuits, each of the timing circuits being connected with one of said subcircuits for providing an actuating signal thereto in response to an applied timing circuit driver signal for a period of a fixed duration;
   D. a plurality of secluded signal receiver circuits, each being connected with one of said timing circuits for providing a timing circuit driver signal output in response to a radio signal of a selected frequency received thereby; and
   E. a portable radio signal transmitter for providing a continuous radio signal at selected frequencies, adapted to be worn on the person of a user of the system, whereby game-simulating targets are released as the transmitter is transported into the vicinity of the secluded receivers as the user moves through the simulated environment.

2. The system of claim 1 further comprising manually operable circuit means for applying a further timing circuit driver signal to each of said timing circuits.

3. A target release system particularly suited for use in launching surprise targets from visually secluded sources in response to a mobile participant, comprising:
   A. A limited range receiver means including a plurality of positionally fixed radio signal receivers disposed in mutually spaced relation, each of said signal receivers being characterized by a given reception range and tuned to respond to radio signals of a selected signal frequency transmitted from a location within the given reception range for providing a signal output comprising timer circuit driver signals;
   B. a portable radio signal transmitter adapted to be transported by a participant along a path extending from locations beyond the reception range of selected signal receivers through locations within the reception range of the receivers for periods of variable durations for continuously transmitting radio signals at said selected frequency, whereby radio signals are caused to be received at the selected signal receivers for periods having durations commensurate with the durations of the periods during which the transmitter is transported through locations within the range of the selected radio signal receivers;
   C. means responsive to timer circuit driver signals applied thereto for providing a signal output comprising target release actuator signals, comprising a plurality of timer circuits and means for applying timer circuit driver signals to each timer circuit of the plurality of timer circuits including a lead connecting each of the timer circuits to one radio signal receiver of said plurality of positionally fixed radio signal receivers; and D. a plurality of target release means for releasing a surprise target in response to a target release actuator signal applied thereto, and means connecting one timer circuit of said plurality of timer circuits to each target release means.

4. The improvement of claim 3 wherein each of said timer circuits include:
   A. circuit means including a normally open switch for connecting said source of electrical potential to said target release means;
   B. means including a relay connected to the normally open switch and adapted to respond to an electrical signal applied thereto for closing said switch; and
   C. a timer circuit including power supply means for applying an electrical signal to said relay, and means for connecting said power supply circuit to said relay in response to a driver signal applied to the timer circuit.

5. The system of claim 3 wherein each target release means of said plurality of target release means includes a plurality of sequentially actuable target release boxes, and a target release subcircuit comprising a plurality of normally closed solenoid-actuated latches, each of said solenoid-actuated latches being mounted on a target release box and adapted to open in response to a target release actuator signal applied thereto for initiating an actuation of the target release box, and a plurality of normally open box-arming switches, each being mounted on a target release box and adapted to be closed in response to an actuation of the box for serially completing a circuit between the timer circuit and a solenoid actuated latch mounted on an adjacent target release box of said plurality.

6. The system of claim 3 wherein each timer circuit includes means for imposing on each target release means a quiescent state, subsequent to a release of a surprise target thereby, for a period having a duration exceeding the duration of the period during which the radio signals are received by the receiver to which the timer circuit is connected.

7. In a target release system particularly suited for use in launching surprise targets from visually secluded sources in response to the presence of a mobile participant simulating hunting of wild game, the improvement comprising:
   A. a portable radio signal transmitter adapted to be worn by a participant for continuously transmitting radio signals at a substantially fixed frequency;
   B. receiver means including a remote radio signal receiver responsive to radio signals transmitted at the fixed frequency for providing timer circuit driver signals;
   C. means including a timer circuit connected to the radio signal receiver response to timer circuit drive signals applied thereto for providing target release actuator signals; and
   D. a target release means connected to the timer circuit for releasing a surprise target in response to a target release actuator signal applied thereto by the timer circuit.

8. The improvement as defined in claim 7 wherein the target release means includes a plurality of sequentially actuable target release boxes interconnected in a common circuit, and a target release subcircuit comprising a plurality of normally closed solenoid-actuated latches, each of said solenoid-actuated latches being mounted on a target release box and adapted to open in response to a target release actuator signal applied thereto for initiating an actuation of the target release box, and a plurality of circuit connected, normally open box-arming switches, each being mounted on a target release box and adapted to be closed in response to an actuation of the box for serially completing a circuit between the timer circuit and a solenoid actuated latch mounted on an adjacent target release box of said plurality.

9. The improvement as defined in claim 7 wherein said timer circuit includes:
   A. a course of electrical potential;
   B. circuit means including a normally open switch for connecting said source of electrical potential to said target release means;
   C. means including a relay connected to the normally open switch and adapted to respond to an electrical signal applied thereto for closing said switch; and
   D. a timer circuit for applying an electrical signal to said relay including said source of electrical potential, and means for connecting said source of electrical potential to said relay in response to a driver signal applied to the timer circuit.

10. In a target release system for use in simulating hunting of wild game in a simulated environment, the improvement comprising:
   A. a plurality of target boxes secluded in a selected environment and arranged in mutually spaced relation, each box being characterized by an electrically energizable target release mechanism adapted to respond to an actuating signal for releasing a game-simulating target;
   B. circuit means interconnecting said plurality of target boxes for establishing a subcircuit including a multiplicity of sequentially operable target boxes;
   C. a timing circuit connected with said subcircuit for providing thereto an actuating signal in response to an applied timing circuit driver signal for a period of a fixed duration;
   D. a secluded signal receiver circuit connected with said timing circuit for providing a timing circuit driver signal output in response to a radio signal of a selected frequency received thereby; and
   E. a portable radio signal transmitter for providing a continuous signal at selected frequencies, adapted to be worn on the person of a user of the system, whereby game-simulating targets are released as the transmitter is transported into the vicinity of the secluded receiver as the user moves through the simulated environment.

11. A timing circuit particularly suited for controlling the operation of target boxes connected in a system employed in simulating the hunting of wild game comprising:
   A. a timing circuit output switch;
   B. means for closing the output switch including a switch actuating relay connected with a movable shorting bar for displacing the shorting bar of an output switch having a coil adapted to be electrically energized;
   C. a source of positive electrical potential connected to said coil at one side thereof; and
   D. circuit means connected to said coil including a first normally nonconductive NPN transistor connected between the opposite side of the coil and ground potential, and means for switching said NPN transistor to a conducting mode for applying a voltage across said coil including a second NPN transistor connected at its emitter to the base of said first NPN transistor, means including a differential amplifier for providing a positive voltage output signal, a capacitor having one side connected in circuit series with said base of said second NPN transistor, and means for applying a positive voltage to the other side of the capacitor in response to the positive output signal provided by said differential amplifier, whereby the capacitor is caused to charge for applying a positive voltage signal to the base of the first NPN transistor for a period dictated by the duration of the period during which the capacitor is charged.

12. The circuit of claim 11 further comprising means for biasing said differential amplifier to a nonconductive mode, and switching means including a time delay circuit for switching said differential amplifier to a conductive mode in response to a timing circuit driver signal applied thereto.

13. The circuit of claim 12 wherein said switching means includes a second positive source of potential, normally open switch means connected in circuit series between said second positive sources of potential and said differential amplifier, and another relay means for closing said normally open switch means in response to a driver signal applied thereto.

14. The circuit of claim 13 further comprising further switch means for applying a first interruptible driver signal to said other relay means, further source of positive potential, and a latching circuit including a manually operable control switch connected with said other relay means for connecting the other relay means with said further source of positive potential for applying a second interruptible driver signal thereto concurrently with the closing of said normally open switch means, and means connected with said switch actuating relay for interrupting said second interruptible driver signal concurrently with the closing of the timing circuit output switch.

* * * * *

UNITED STATES PATENT AND TRADEMARK OFFICE
CERTIFICATE OF CORRECTION

PATENT NO. : 4,181,911
DATED : January 1, 1980
INVENTOR(S) : Billy E. Black

It is certified that error appears in the above—identified patent and that said Letters Patent are hereby corrected as shown below:

Column 8, line 26, change "3" to ---32---.

line 28, substitute a lowercase "i" for the capital "I" in the first word in the line.

Column 10, line 40, after letter "A.", delete "A".

Signed and Sealed this

First Day of April 1980

[SEAL]

Attest:

SIDNEY A. DIAMOND

*Attesting Officer*      *Commissioner of Patents and Trademarks*